US006788686B1

(12) United States Patent
Khotimsky et al.

(10) Patent No.: US 6,788,686 B1
(45) Date of Patent: Sep. 7, 2004

(54) METHOD OF MAINTAINING PACKET ORDER IN MULTIPATH TRANSMISSION SYSTEMS HAVING NON-UNIFORM TRAFFIC SPLITTING

(75) Inventors: Denis Andreyevich Khotimsky, Eatontown, NJ (US); Santosh Krishnan, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/451,587

(22) Filed: Nov. 30, 1999

(51) Int. Cl.[7] .......................... H04L 12/28; H04L 12/56

(52) U.S. Cl. ....................... 370/394; 370/389; 370/400; 370/401; 370/535; 370/536; 370/537; 370/542

(58) Field of Search ................................ 370/389, 392, 370/393, 394, 411, 437, 465, 470, 471, 473, 474, 475, 535, 536, 537, 542, 412, 415, 416

(56) References Cited

U.S. PATENT DOCUMENTS

| 4,703,475 A | * | 10/1987 | Dretzka et al. | 370/394 |
| 5,127,000 A | * | 6/1992 | Henrion | 370/394 |
| 5,251,210 A | | 10/1993 | Mann et al. | 370/84 |
| 6,226,687 B1 | * | 5/2001 | Harriman et al. | 709/246 |
| 6,246,684 B1 | * | 6/2001 | Chapman et al. | 370/394 |

OTHER PUBLICATIONS

F. M. Chiussi et al, "Advanced Frame Recovery In Switched Connection Inverse Multiplexing for ATM", *Proceedings of 2nd IEEE International Conference on ATM, ICATM '99*, Jun. 1999, pp 404–412.

E. Desmet et al, "Performance Analysis of a Resequencing Unit in a Multipath Self–Routing Switch Fabric", *ITC 14*, Antibes Juan–les–Ins, France, Jun. 6–10, 1994, pp 611–621.

S. K. Biswas et al, "Connection Splitting: An Efficient Way of Reducing Call Blocking in ATM", *IEEE Global Telecommunications Conference, IEEE GLOBECOM 1998 Conference Record*, Sydney Nov. 8–12, 1998, pp 2412–2418.

F. M. Chiussi et al, "Generalized Inverse Multiplexing of Switched ATM Connections", *IEEE Global Telecommunications Conference, IEEE GLOBCOM 1998, Conference Record*, Sydney, Nov. 8–12, 1998, pp 3134–3140.

J. Duncanson, "Inverse Multiplexing", *IEEE Communications*, vol. Apr. 1994, pp. 34–41.

H. Adiseshu et al, "A Reliable and Scalable Striping Protocol", *ACM SIGCOM '96 Conference*, pp. 131–142.

P. H. Fredette, "The Past, Present, and Future of Inverse Multiplexing", *IEEE Communications*, vol. 32, Apr. 1994, pp 42–46.

ATM Forum, "Inverse Multiplexing (IMA) for ATM Specification Version 1.0", AF–PHY–0086.000, Jul. 1997.

J. S. Turner, "Resequecing Cells in an ATM Switch", *Washington University Computer Science Department, Report WUCS–91–21*, 1991.

(List continued on next page.)

*Primary Examiner*—Huy D. Vu
*Assistant Examiner*—Thomas E. Volper

(57) ABSTRACT

A method to restore the original order of packets in an end-to-end data flow after the flow has been multiplexed over a set of communication or switching paths whose available bandwidth varies significantly over time. To convey the relative path ordering, the method considers all possible path pairs. For each such path pair it enumerates the packet block transmissions, i.e., the sequences of packets transmitted on a selected path of the given path pair which are not interleaved by the packets transmitted on the other path of the same pair. Packet block enumeration for each path pair is performed independently and does not take into account any packets transmitted on the other paths. A packet transmitted on a given path carries a set of packet block identifications for each path pair the given path belongs to. Increasing the range of the packet block enumeration, the robustness of the method can be adjusted to an arbitrary level of packet loss tolerance.

13 Claims, 12 Drawing Sheets

OTHER PUBLICATIONS

T. Chaney et al, "Design Of A Gigabit ATM Switch", *Washington University Computer Science Department, Report WUCS–96–07*, 1996.

Sklower et al, "The PPP Multilink Protocol (MP)", *Internet Request for Comment RFC 1990*, Aug. 1996.

I. Widjaja et al, "The Helical Switch: A Multipath ATM Switch Which Preserves Cell Sequence", *IEEE Transactions on Communications*, vol. 42, No. 8, Aug. 1994, pp 2618–2629.

* cited by examiner

METHOD OF MAINTAINING PACKET ORDER IN MULTIPATH TRANSMISSION SYSTEMS HAVING NON-UNIFORM TRAFFIC SPLITTING

FIELD OF THE INVENTION

This invention relates generally to the field of communications and switching systems and in particular, to a method of packet resequencing where multiple limited-bandwidth paths are available for data transmission between a source and a destination.

BACKGROUND OF THE INVENTION

Networks provide a convenient and powerful conduit for exchanging or transferring information, e.g., data, voice, text, and video, among different communication devices connected to the network(s) such as host computers, computer terminals, multimedia workstations, fax machines, printers, servers, telephones, videophones and the like. A network typically comprises switching nodes connected to each other and to the communication devices by one or more communication links. Each link may be characterized by various configuration and operation parameters, or metrics, among which the link capacity and available bandwidth are two important ones. Information carried by the network may be in any form, but is often formatted into packets of either fixed or variable length.

When information is to be exchanged between two communication devices, a path is established within the network between the nodes (called a source node and a destination node) with which the information exchanging devices are associated. Each individual path, which is a concatenation of a number of communication links and switching devices, preserves the order of the transmitted packets and can carry only as much traffic as its link or device of the lowest capacity or available bandwidth. Such a link is often called a bottleneck link. If more than a single path can be established between the source and destination, then traffic can be split between the different paths, with the overall capacity increasing up to the sum of the bottleneck bandwidths of the available paths. However, if the traffic stream between the source and destination belongs to a single logical entity, then splitting it requires additional measures to maintain the integrity of that stream. In particular, the packet order at the destination has to be maintained the same as the original packet order at the source. The logical entity carrying multiple packets between the same pair of nodes over an extended period of time and requiring that the order of the packets be continuously maintained is referred to as a flow.

The concepts of traffic splitting and bandwidth aggregation are well known in data networking. Reincarnated as bandwidth on demand, inverse multiplexing, dynamic routing, or striping, they employ a common idea of using several lower capacity channels to implement a single logical high-capacity channel in a transparent manner. While various existing techniques and implementations differ from each other in many aspects, such as the operating environment, the splitting granularity, the applicable protocol stack layer, the loss/delay characterization of the medium, synchronous vs. asynchronous use of resources, etc., they all face the similar design challenges such as load balancing, differential delay compensation, and maintaining integrity of the data flow.

Partitioning an incoming data flow into segments of certain granularity, forwarding them along multiple paths to ensure fair load distribution and balancing between the paths, and re-assembly of the data flow at the destination are essential for achieving the goal of bandwidth aggregation. This may present less of a problem, if the lower bandwidth channels have equal capacity and are used exclusively by the demultiplexed traffic. However, if the capacity available to different individual channels is not equal or varies in time, the load balancing becomes non-trivial. Differential delay (sometimes referred to as skew) results from the fact that individual channels, which generally follow different paths, may have different propagation and processing delays. Therefore, a re-assembly engine at the receiving end has to be able to buffer each channel's data to allow for correct reconstruction of the aggregate flow. Maintaining flow integrity includes both the restoration of the original order of the data segments under normal operating conditions and maintaining the consistent order in the presence of losses and failures.

The present invention addresses the issue of packet re-ordering after splitting in a communication and switching environment which is characterized by large bandwidth-delay product value, uneven variable in time capacities of the individual paths, large variable delays, and non-zero probabilities of packet loss. It is demonstrated that under described conditions, existing techniques, based primarily on marking the order of the packets in the original flow, may not be adequate. Consequently, a new packet re-ordering method is described which satisfies the above operating requirements.

SUMMARY OF THE INVENTION

The invention presents a method to restore the original order of the packets in an end-to-end data flow after the flow has been multiplexed over a set of communication or switching paths whose available bandwidth varies significantly over time. It is observed that the prior art techniques which are based on sequentially numbering the packets in the flow and restoring the packet order with the use of the packet sequence numbers can lead to ambiguity, when the re-assembly engine a the destination node is presented with more than one packet carrying the same sequence number. This situation can occur even if no packet has been lost in transmission.

Unlike the prior art techniques, the present invention conveys the relative order of available paths, rather than the order of the transmitted packets. It guarantees that the re-assembly engine never enters the ambiguous state, provided no packet loss has occurred. Furthermore, it provides a fault-tolerant framework to ensure the preservation of the original order under specified severity of the packet losses.

To provide the basis for conveying the relative path ordering, the method of the present invention considers all possible path pairs. For each such path pair it enumerates the packet block transmissions, i.e., the sequences of packets transmitted on a selected path of the given path pair which are not interleaved by the packets transmitted on the other path of the same pair. Packet block enumeration for each path pair is performed independently and does not take into account any packets transmitted on the other paths. A packet transmitted on a given path carries a set of packet block identifications for each path pair the given path belongs to. Increasing the range of the packet block enumeration, the robustness of the method can be adjusted to an arbitrary level of packet loss tolerance.

BRIEF DESCRIPTION OF THE DRAWINGS

The features and advantages of the present invention will become more readily apparent from the following detailed description of the invention in which.

DETAILED DESCRIPTION OF THE INVENTION

The detailed description of the invention, which is presented below, is divided into the following sections. Section 1, introduces the model of the multipath switching system. Section 2, provides a review of the existing techniques related to traffic splitting in the data networks. Section 3 introduces the notion of rank, or a path ordering vector, provides necessary examples and explanations, and discusses the properties of the rank-based packet enumeration scheme. The details of the preferred embodiment of the ingress and egress controllers are given in Section 4.

1. Multipath Switching Systems

Figure 1:
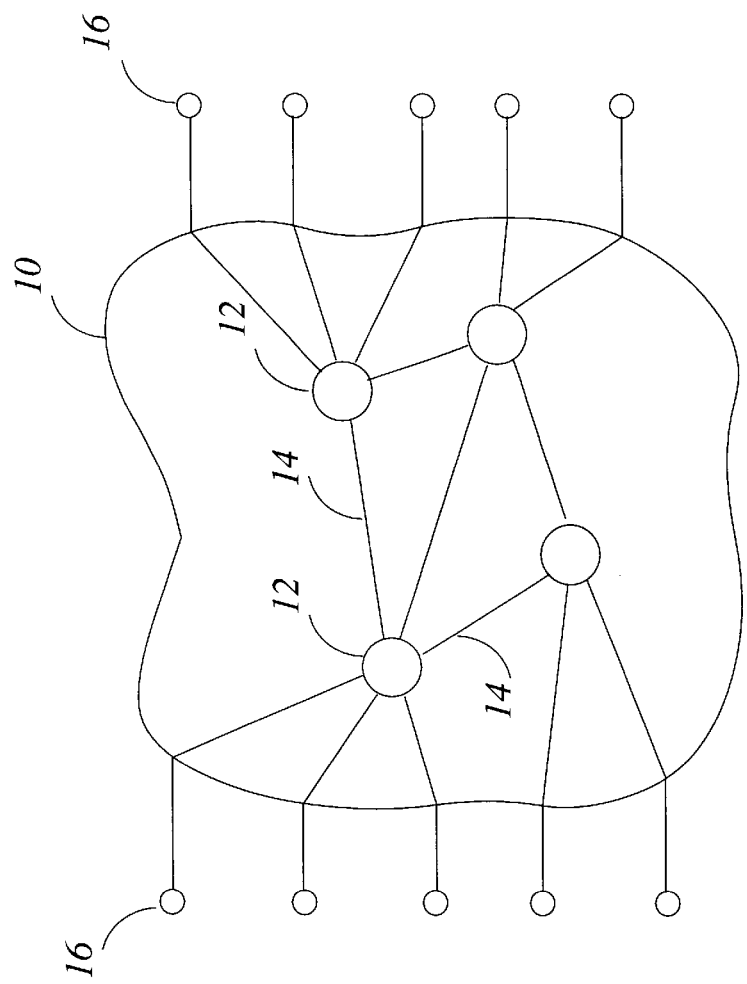
FIG. 1 illustrates the structural components of a typical core switching system.
Figure 2:
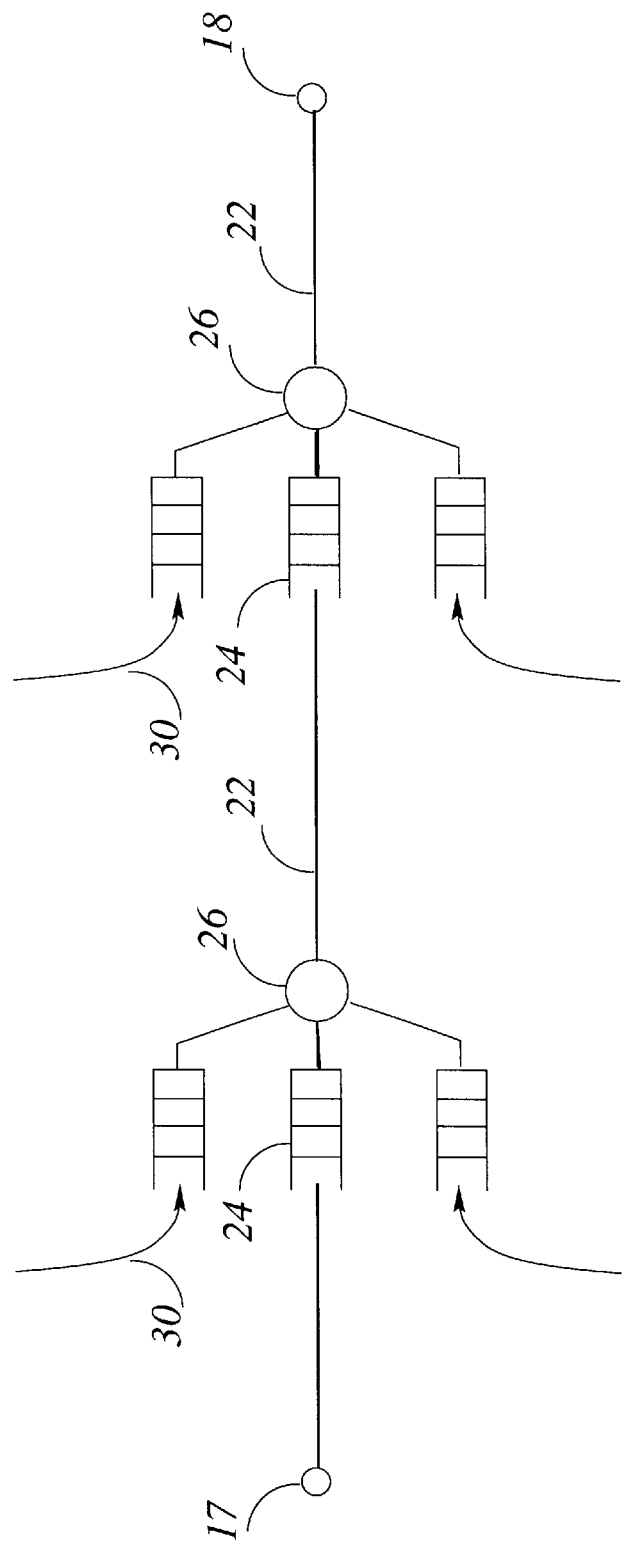
FIG. 2 illustrates a switching path between the source and destination points through a core switching system.

A multipath switching system is built around a core packet switching system which is shown in FIG. 1. The core packet switching system 10 includes nodes 12 interconnected by communication links 14. It provides a switching path between each pair of its edge points 16 and guarantees first-in, first-out (FIFO) delivery of data along each switching path. Such a system may be represented by a single switch or by a network segment containing multiple interconnected switches. With reference to FIG. 2, each unidirectional switching path between source point 17 and destination point 18 may contain multiple contention points (i.e., links of limited bandwidth 22) equipped with plurality of buffers 24 which are served according to a scheduling discipline enforced by scheduler 26. Each link along the path is shared by multiple traffic streams 30, which may include both "guaranteed" and "best effort" traffic.

Figure 3:
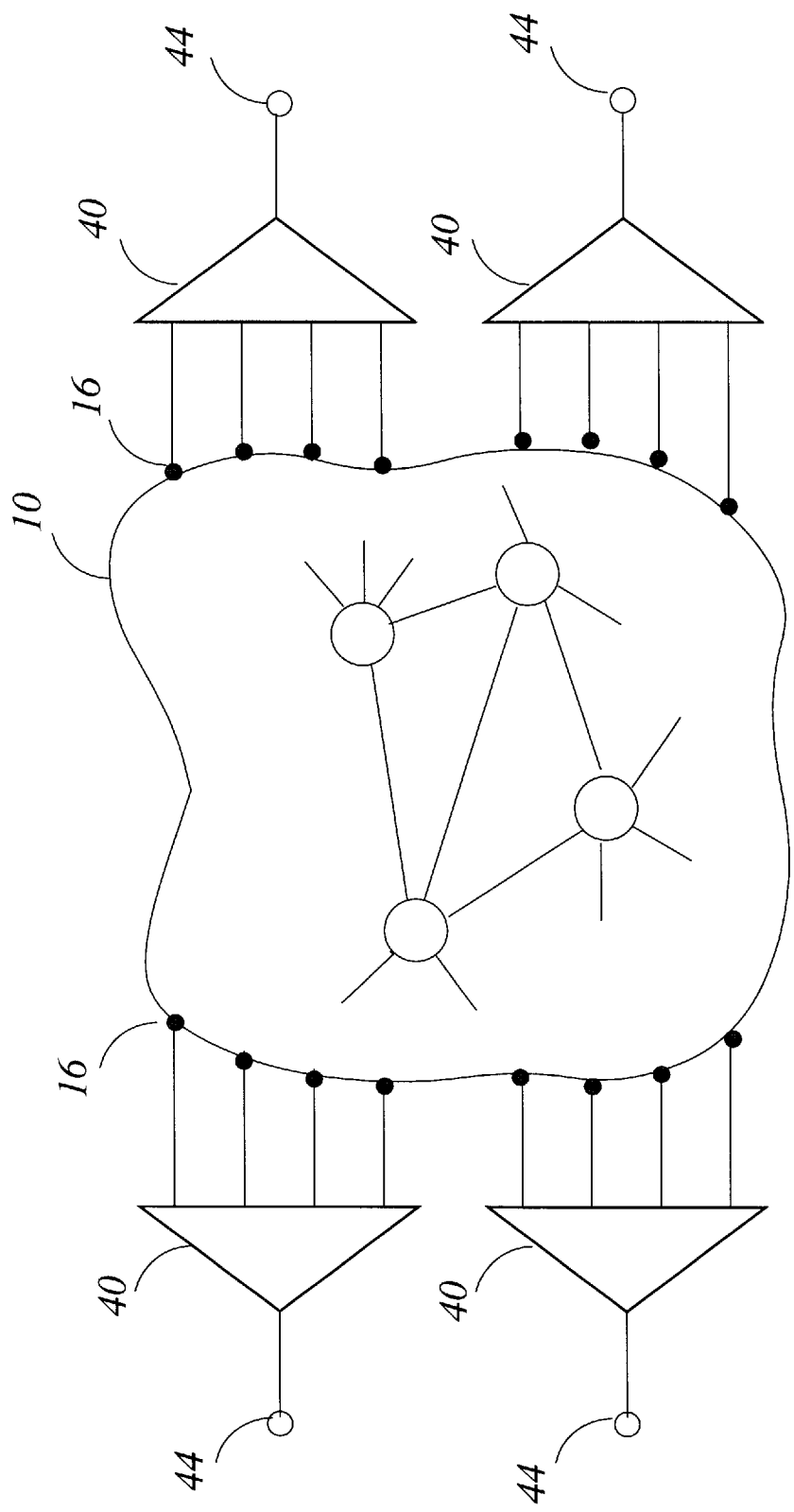
FIG. 3 illustrates a multipath switching system with the switching system of FIG. 1 in its core.

This core system 10 can be used to provide aggregated switching bandwidth to traffic streams by splitting them across several switching paths, as shown in FIG. 3. Specifically, the splitting of a data stream between ports 44 of the multipath switching system requires that a switched inverse multiplexing controller 40 be associated with a set of the core system edge points 16. Controller 40 combines the functions of an input controller and an output controller. It acts as an inverse multiplexor (demultiplexor) with respect to the inbound split traffic streams and as a resequencer (or multiplexor) with respect to the outbound streams. Because of link sharing and presence of buffers, the available on any of the individual switching paths may vary over time, possibly, but not necessary, being subject to minimum bandwidth reservation.

With continued reference to FIG. 3, a flow is a portion of the traffic carried between any pair of ports 44 for an extended period of time, that constitutes a single logical entity and requires that the order of its information units be preserved. Throughout this disclosure, the term flow is used in a broad sense and encompasses both the hard-state virtual circuits, which require an explicit set-up and tear-down procedures, and the soft-state flows, like those of the Internet Protocol (IP) suite, that automatically expire as a result of a timeout event. As is known, a flow can be transmitted through a multipath switching system using a single path or multiple paths. In a latter case, which represents the target of the present disclosure, such a flow is termed a split flow. Finally, a subflow is a portion of a split flow transmitted on any given path.

As is used herein, a packet denotes a data unit of a split flow that is assigned its own sequence control header and is transmitted on a single path within a multipath switching system. This usage is somewhat different from that of a variable-length protocol data unit, e.g., IP packet. In fact, an IP packet belonging to a split flow can either be transmitted on a selected path as a single entity or partitioned into smaller segments each of which can follow a different path and carry a sequence control header of its own. A sequence of packets of the same split flow consecutively transmitted over given path A without being uninterrupted by packet transmissions on given path B constitute a packet block of A with respect to B. A packet block does not carry any additional header information. Finally, a frame in an appropriate context is a set of consecutive enumerated items exhausting the entire range of the sequence numbers.

We assume that the switching paths provided by the core switching system are characterized by large bandwidth-delay product value, thus making application of the end-to-end feedback control impractical. However, we assume the presence of a hop-by-hop flow control scheme that can be used to regulate the operation of the demultiplexor, allowing it to dynamically adjust the amount of traffic forwarded on any given path in accordance with available switching bandwidth. In addition, we note that no matter how efficient the dynamic load balancing scheme is, the losses within a switching path caused by congestion prevention or congestion management action can not be completely excluded.

To summarize, we are considering a multipath switching system which guarantees per-path FIFO ordering of the delivered packets, allows splitting of the traffic flows, and is characterized by:

- arbitrary nominal split weights, based on the residual bandwidth available for reservation to a given traffic flow;
- time-variability of the bandwidth instantaneously available on any given path, including the situations when no traffic can be transmitted at all for prolonged time intervals;
- arbitrary long delays, caused by independent buffering and cross-traffic exposure across different switching paths;

non-zero probability of packet loss on any switching path.

As will become clearer, the present invention is a packet resequencing protocol operating in the environment described above that satisfies the following requirements:

forward control ordering;

relatively low control overhead;

flow re-assembly consistent with the original order of the packets;

fault-tolerant behavior in the presence of path exclusions, large delays and limited packet losses.

2. Existinq Techniques of Traffic Splitting

Existing traffic splitting and bandwidth aggregation schemes (see, e.g., Duncanson, "Inverse multiplexing", *IEEE Communications*, 32(4):34–41, April 1994; and Fredette, "The past, present, and future of inverse multiplexing, *IEEE Communications*, 32(4):42–46, April 1994) may be generally classified according to the approach taken to solve the problems of differential delay compensation and traffic integrity maintenance. Specifically—those schemes requiring tight bounds on the delay and those requiring asynchronous ones. Most of the well-known end-to-end bandwidth aggregation protocols fall in the first category.

Tight Delay Bounds Techniaues

Incremental bandwidth on demand (BONDING) is a standard for aggregating multiple switched 56 and 64 kbps point-to-point channels (see: BONDING Consortium. Interoperability Requirements for n×56/64 kbit/s calls. Version 1.0, September 1992.) It employs a fixed size multi-frame structure, uses constant bandwidth channels with a handshake procedure for fixed delay compensation, as well as carries an optional provision for continuous delay monitoring. The frame sequence numbers are used to higher-level recovery when synchronization is lost.

Inverse multiplexing for ATM as standardized by the ATM Forum in July 1997 (ATM Forum. Inverse Multiplexing for ATM Specification Version 1.0. af-phy-0086.000, July 1997) requires equal-bandwidth physical links and assumes that the differential delay remains bounded. The entire point-to-point cell stream is treated as a single entity with the individual cells dispatched onto a group of N independent physical links in a synchronous cyclic order. The IMA Control Protocol cells carry the alignment information, whereas the overhead Filler cells maintain continuity of the flow in the absence of user traffic.

The delay equalization techniques in the point-to-point environment are generally described in U.S. Pat. No. 5,251, 210 for "Method and apparatus for transforming low bandwidth telecommunications channels into a high bandwidth telecommunication channel" which issued on Oct. 5, 1993.

In the switching environment, timestamping and enforced delay equalization are commonly used in multipath switch architectures, where the individual packets or cells are dynamically routed from the input to the output port (see, for example: Turner, "Resequencing cells in an ATM switch", Washington University Computer Science Department, Report WUCS-91-21, 1991; Chaney, Fingerhut, Flucke, and Turner, "Design of a gigabit ATM switch", Washington University Computer Science Department, Report WUCS-96-07, 1996; Widjaja and Leon-Garcia, "The helical switch: A multipath ATM switch which preserves cell sequence", *IEEE Transactions on Communications*, 42(8):2618–2629, August 1994; and Desmet, Steyaert, Brunel, and Petit, "Performance analysis of a resequencing unit in a multipath self-routing switch fabric—Fundamental Role of Teletraffic in the Evolution of Telecommunications Networks", *Proc. of 14-th International Teletraffic Congress—ITC 14.*, pages 611–621, Antibes Juan les Pins, France, June 1994. Elsevier Science B.V. 1994.) Note that a timestamp can be viewed as a large size sequence number, whose range far exceeds the value corresponding to the bandwidth-delay product.

The techniques requiring fixed path bandwidth and tightly bounded delay are clearly non-applicable in the operating environment of the multipath switching systems, as described above.

Asynchronous Resequencing Techniques

The most widely-described technique in this group is represented by total order sequence numbers. For example, the PPP Multilink (MP) protocol (Sklower et al., "The PPP Multilink Protocol (MP)", Internet Request for Comments RFC 1990, August 1996) breaks packets into numbered segments and transmits them across different links. The receiver uses the sequence numbers to restore the segment order and detect losses. Although the MP protocol has been successfully deployed for quite a while, it is known that it may fail due to the excessive sequence number skew, if some of the links remain idle for long time. Recently, the general limitations of the total order sequence numbers and the associated ad hoc modifications in the asynchronous switching environment, have become understood.

Figure 4:
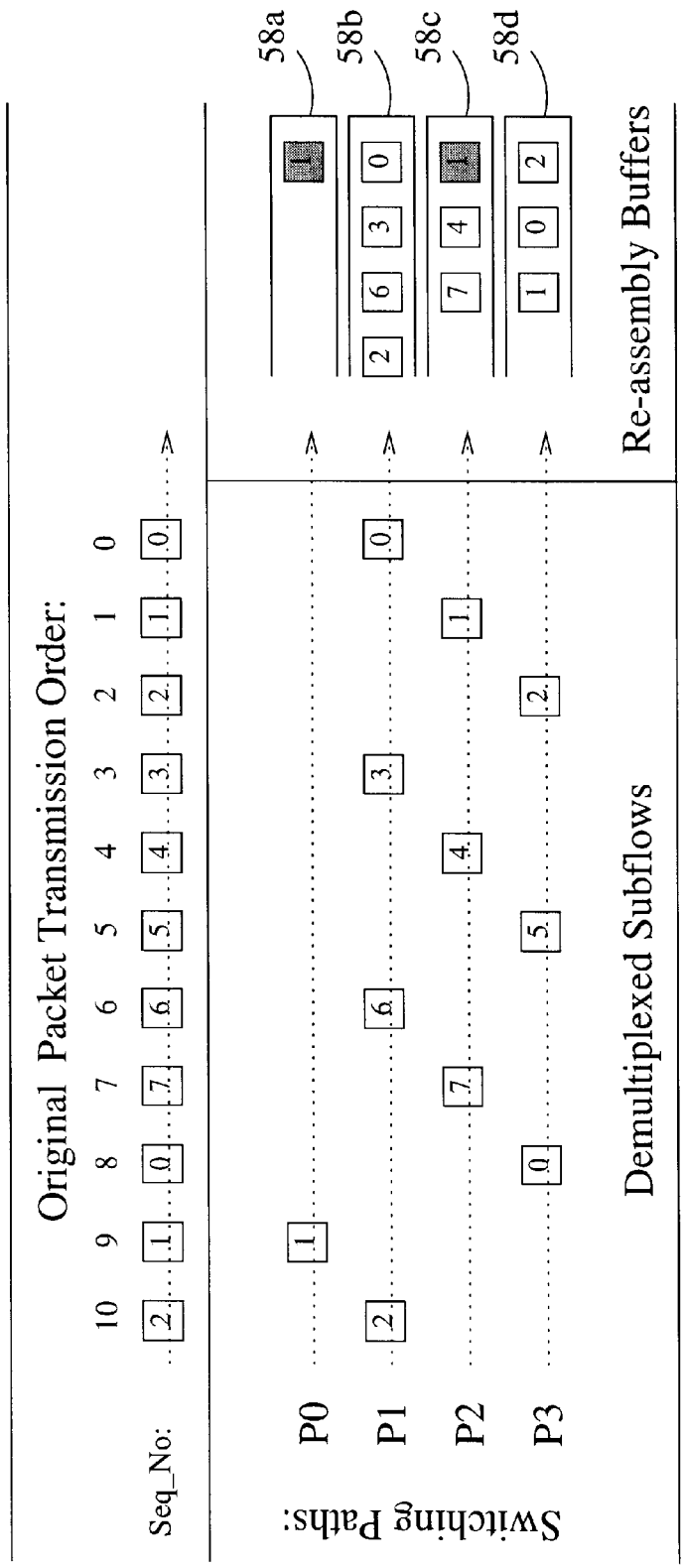
FIG. 4 is a multipath packet transmission scenario, which illustrates a characteristic problem associated with the use of the total order sequence numbers.

With simultaneous reference now to FIG. 3 and FIG. 4, consider the packet sequencing scenario depicted in FIG. 4 in which eleven packets of a given split flow are demultiplexed across four switching paths identified as P0, P1, P2, and P3, thus comprising four subflows. To perform resequencing function, controller 40 acting as an output controller at the destination port maintains four re-assembly buffers identified as 58*a*, 58*b*, 58*c*, and 58*d*. For the purposes of this example, a frame size of eight is used in assigning sequence numbers to the packets.

In this example, the packet dispatcher of the controller 40 associated with the source port temporarily excludes switching path P0 from the dispatch sequence due to congestion. The congestion is relieved, however, and packet one in the second frame is dispatched on switching path P0. As a result, re-assembly buffers 58*a* and 58*c* both end up with a packet having a sequence number of one positioned at the head of their queues as indicated by the shaded rectangles in the respective buffers. Controller 40 associated with the destination port is therefore unable to determine which of the two packets carrying sequence number one located at the head of re-assembly buffers 58a and 58c should be dequeued next. The similar scenarios can be constructed for the packet re-ordering schemes which complement the total order sequence numbers by a pointer to the previous path or to the next path used for packet dispatch. (See, e.g., Chiussi, Khotimsky, and Krishnan, "Generalized inverse multiplexing of switched ATM connections", *Proceedings of IEEE GLOBECOM'98. The Bridge to Global Integration*, Sydney, Australia, November 1998.)

The strIPe protocol (Adiseshu, Parlukar and Varghese, "A reliable and scalable striping protocol", *Proceedings of the ACM SIGCOMM'96. Computer Communications Review*, 20-4, pp. 131–142) addresses the issues of load sharing and resequencing while transmitting variable length IP packets over the links of different capacity. It avoids using explicit sequence numbers by making a resequencing algorithm a mirror copy of a channel striping algorithm. This protocol runs in point-to-point mode, does not allow variable path bandwidths and is very sensitive to losses.

The ATM connection splitting model proposed by Biswas and colleagues (Biswas, Izmailov, and Sengupta, "Connection splitting: An efficient way of reducing call blocking in ATM", *Proceedings of IEEE GLOBECOM'98. The Bridge to Global Integration*, Sydney, Australia, November 1998) performs end-to-end connection splitting on cell-by-cell basis. It allows the individual path bandwidths to differ from each other and vary in time. Resequencing relies on the periodic insertion of the numbered overhead alignment cells, which precede the data cell blocks transmitted on each path, and leaves the ATM cell format intact. This model applies specifically at the network edge, and never within the network. It requires the size of the data cell blocks to be fixed and does not permit the network to use the packet discard facility.

SCIMA Packet Ordering and Re-Assembly Technique

The Switched Connection Inverse Multiplexing for ATM, or SCIMA, offers an alternative. Instead of using the total order sequence numbers, the SCIMA ordering and re-assembly protocol employs a new predictive technique involving use of per-path sequence numbers in conjunction with a NextPath pointer, i.e., an id of the switching path to be used for the next packet transmission. In the ideal situation, when no losses occur and the receiver can afford an indefinite wait, the NextPath pointer indeed provides a sufficient mechanism to ensure unambiguous segment resequencing. In addition, the per-path sequence numbers with range M guarantee detection of a loss burst as long as its length is not a multiple of M. An isolated segment loss per switching path is adequately handled by retransmitting the NextPath value with the subsequent segment of the same subflow. Multiple losses or timeouts require invocation of the higher-level Frame Recovery mode (see, e.g., Chiussi, Khotimsky and Krishnan, "Advance frame recovery in switched connection inverse multiplexing for ATM", *Proceedings of* 2nd *IEEE International Conference on ATM, ICATM'99*, Colmar, France, June 1999.)

The SCIMA protocol addresses the operating characteristics of bandwidth aggregation in a core switching system described herein. It applies to a switching system which provides additional fields in the segment' header, and requires mechanism for the path prediction. However, it is sensitive to multiple segment losses.

3. Rank-Based Packet Enumeration

The rank-based packet enumeration and resequencing scheme, which is the subject of present invention, employs the general framework of the switched connection inverse multiplexing (SCIMA). SCIMA combines several low port-rate switches and exhibits the performance comparable with that of a single high port-rate switch by splitting just a small number flows. The concept of splitting with respect to an individual flow is illustratively depicted in FIG. 5.

Figure 5:
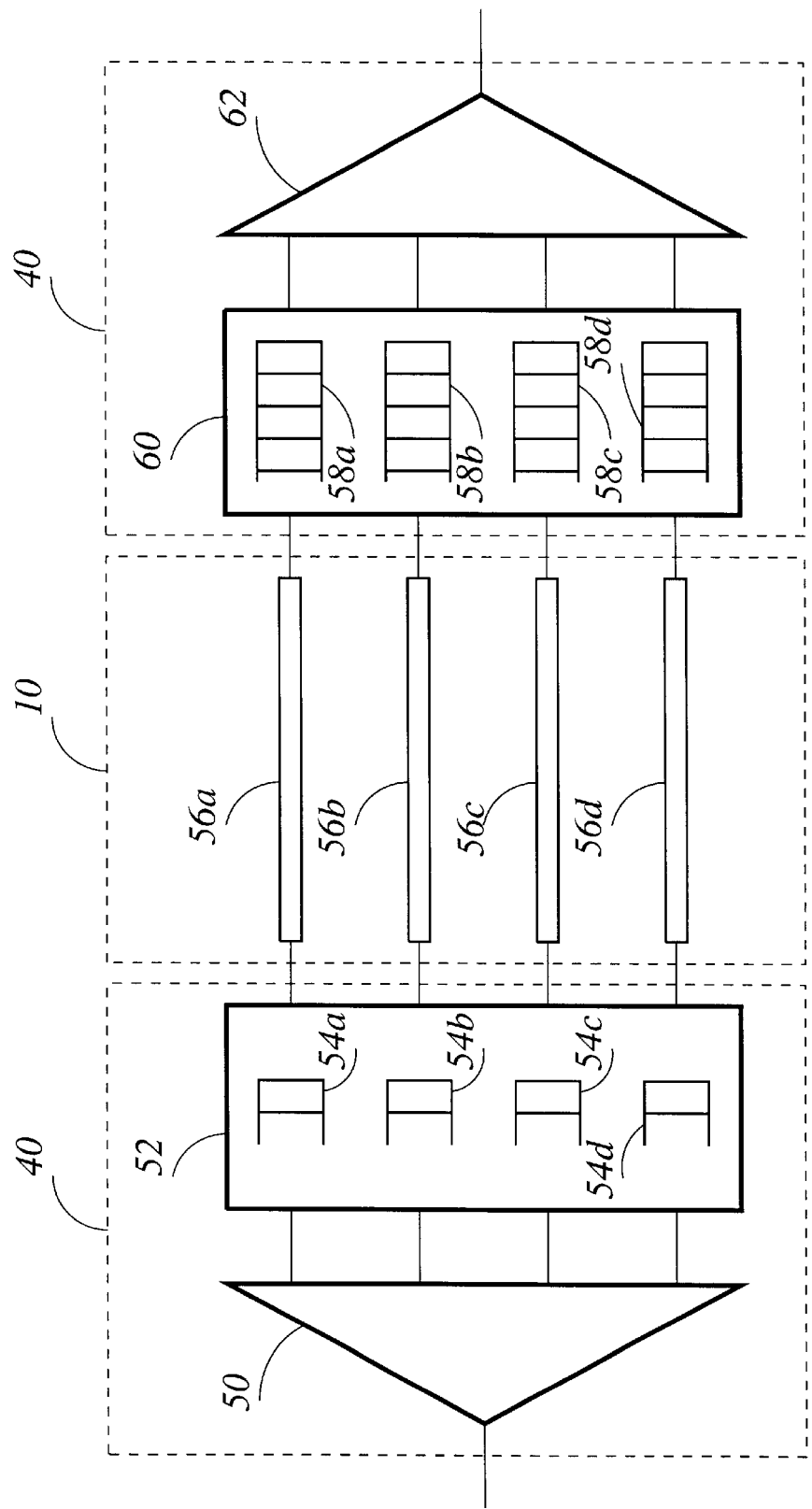
FIG. 5 is a high-level block diagram of a point-to-point segment of a multipath switching system, which illustrates the concept of flow splitting.

With reference now to FIG. 5, dispatch engine 50, which is fed by the flow queue, distributes the packet of the flow among the available paths according to the predetermined split weights, congestion status of the paths, and other criteria. The dispatched packets enter the temporary subflow storage 52 which is provided with small subflow FIFO buffers 54a–54d and which conveys backpressure from the core switching system 10 to the dispatch engine 50, aligns the operation of dispatch engine 50 with the server associated with core system's port 16, and assigns sequence control fields to packets. Dispatch engine 50 and subflow storage 52 together ensure the input controller functionality of controller 40 with respect to the given flow. The switching paths 56a–56d transporting packets via the core switching system 10 contain buffers and contention points and, therefore, introduce differential delay and may cause packet loss. Packets successfully delivered through the core switching system 10 are stored in the re-assembly buffers 58a–58d of the subflow storage 60, where they become subject to resequencing operation performed by re-assembly engine 62. Subflow storage 60 and re-assembly engine 62 together ensure the output controller functionality of controller 40 with respect to the given flow.

As can be appreciated, rank-based packet enumeration and resequencing is based on two principles. First, the sequence number does not have to increase as long as the packets are transmitted along the same path, which guarantees the FIFO order of packet delivery. Second, if the number of available switching paths remains limited, it is sufficient to order just the small number of paths rather the entire number of packets in transmission. To enable the receiver to order paths, rather than packets, the sequence control header should carry relative rather than absolute ordering information. At any given moment of time, it would keep the re-assembly engine informed of the identity of the re-assembly buffer which has to be dequeued next. If the relative ordering information is conveyed correctly, the ambiguous situation when two or more packets arriving on distinct switching paths having indistinguishable sequence control headers can be avoided. Note that such ambiguity is inevitable in principle, when the absolute (total order) numbering scheme is used.

Figure 6:
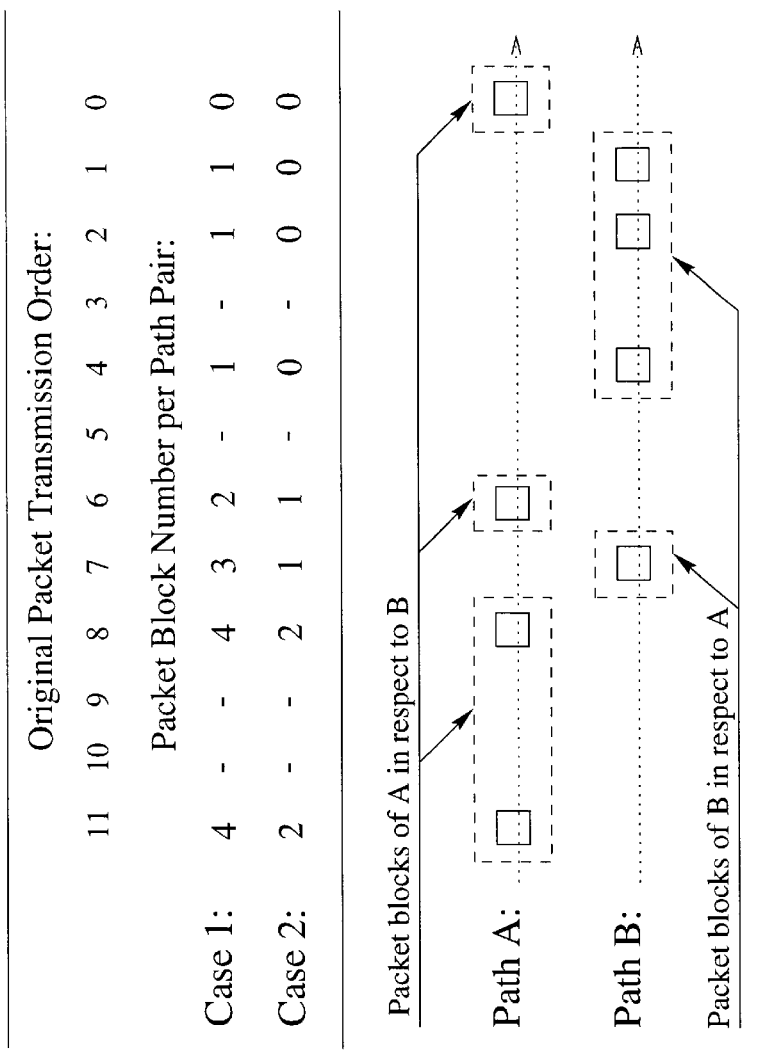
FIG. 6 is a possible scenario of packet transmission on a path pair.

Let K be the number of switching paths available for the flow transmission between the source port and destination port of the multipath switching system. Select an arbitrary pair of paths and consider the packet transmission on the selected path pair, temporarily ignoring any packet transmissions that occur on other paths. Note that there are K(K−1)/2 path pairs for the given source and destination. FIG. 6 exemplifies a possible scenario of packet transmissions. In this figure, packets numbered 0, 6, 8, and 11 in the original order were transmitted on Path A, packets 1, 2, 4, and 7 were transmitted on Path B, whereas packets 3, 5, 9, and 10 were transmitted elsewhere and, therefore, are not shown. For each path in the given pair, consider the sequences of packets transmitted on the same path which are not interleaved by packets transmitted on the other path of the given pair, although possibly are interleaved by packets transmitted on some other path. Each sequence may contain one or more packets.

Five such sequences can be identified on FIG. 6: packets 0 on path A; packets 1, 2, and 4 on path B; packet 6 on path A; packet 7 on path B; packets 8 and 11 on path A. A sequence of packets transmitted on path A without interruption by a packet transmission on path B is referred to as a packet block of path A with respect to path B. For each path pair such blocks can be sequentially enumerated (FIG. 6, case 1) and the packet block sequence number can be transmitted with the packet. Observe that the identity of a switching path is known to both the source and destination nodes; therefore, the least significant bit of the block sequence number in case 1 does not carry any useful information and does not have to be transmitted with the packet. This leads to the block enumeration scheme shown as Case 2: out of two packet blocks with the same sequence number transmitted on different paths of the same path pair, a packet block transmission on path A precedes a packet block transmission on path B. Path A is called a priority path of the pair. Choose size m of the block sequence numbers and make the numbers wrap around in modulo $2^m$. The so determined packet block sequence number is referred to as rank component of degree m of the path pair. Observe that having taken into account the FIFO order of packet delivery along any path and assuming no packet is lost in transmission, degree m=1 is sufficient to guarantee unambiguous operation of the re-assembly engine for the given path pair under arbitrary dispatch pattern and packet delay.

Figure 7:
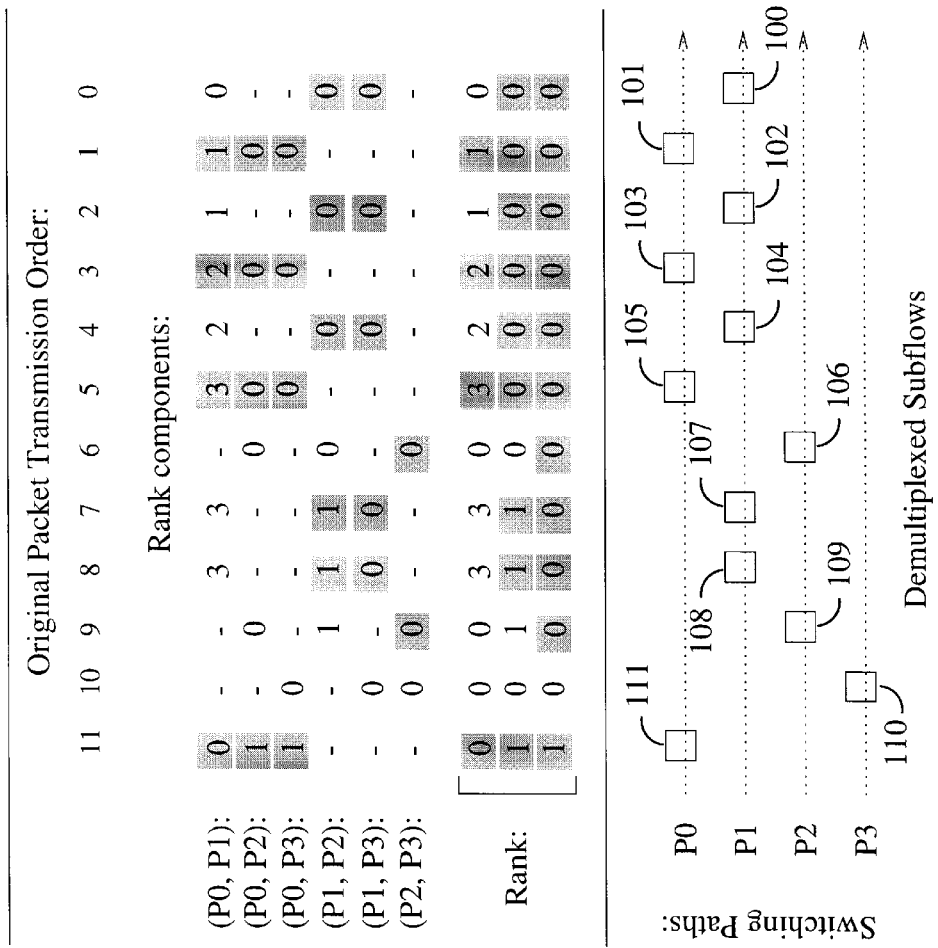
FIG. 7 is a possible scenario of packet flow splitting in a multipath switching system, which illustrates the concept of the rank.

Rank of degree m of a packet transmitted on any given path is defined as an ordered set of rank components for all available path pairs the given path belongs to. Thus every packet has to carry a rank value containing K−1 rank components, whereas the state of the dispatch engine and the state of the re-assembly engine each contains K(K−1)/2 rank components. The concept of rank is illustrated in FIG. 7 for K=4 and m=2. The rank components belonging to packets transmitted on the priority path of the respective pair are shaded.

The rank of each packet is a three-component vector; a dash indicates that a packet is transmitted outside the given path pair. Initially, the packet block numbers for all six possible path pairs are set to zero. Packets 100, 102, 104 transmitted on path P1 and packets 101, 103, 105 transmitted on path P0 each constitute a packet block for path pair (P0, P1). Therefore their (P0, P1)-rank component is incremented by one every time the priority path gets a packet. At the same time, packets 101, 103, and 105 transmitted on path P0 constitute a single packet block with respect to both path P2 and path P3. Consequently, their rank component for path pairs (P0, P2) and (P0, P3) remains the same. The same holds for packets 100, 102, 104 transmitted on path P1. Packet 106 of path P2 constitute a packet block with respect to paths P0 and P1, but since in either of two case it belongs to a non-priority path, its rank components for path pairs (P0, P2) and (P1, P2) are equal to those of the respective packet blocks transmitted on those paths. Packets 107 and 108 transmitted back to back on path P1 constitute a separate block with respect to paths P0 and P2, while with respect to path P3 they share the packet block with packet 100, 102, and 104. Therefore their ranks are identical. On the other hand, packets 106 and 109 transmitted on path P2 share the same packet block with respect to P0 and P3, but belong to different packet blocks with respect to P1. Because of that their ranks differ in one component. Packet 111 of path P0 marks a beginning of a block with respect to all other paths, and since it belongs to a priority path in all three cases, all its rank components are advanced by one if compared with a previous packet block of the respective path pair. The rank components are incremented in modulo $2^m=4$. Note that rank components are assigned independently for all available path pairs.

Properties of Rank-Based Packet Enumeration

It can be observed that each rank component combines the properties of the per-path sequence number and the pair-wise sequence number. Furthermore, the size of the complete sequence control header is linear both in the number of available switching paths and the rank's degree and equals to (K−1) m bits.

To support sequence control header generation, the dispatch engine is required to maintain a state which for every available path pair contains the current rank component and the indication whether or not the most recent packet was transmitted on a priority path of the pair. Thus, the size of the sender's state is equal K(K−1)(1+m)/2 bits. When a certain path is selected for an impending packet transmission, the K−1 path pairs involving that path are affected. If the selected path is a priority path of the affected pair while the pair's previous packet transmission occurred on a non-priority path, then the rank component of that pair is incremented.

The re-assembly engine examines the status of the re-assembly buffers, in particular, the value of sequence control headers carried by the packets at the head of those buffers, and selects one of the packets for delivery in order. The re-assembly engine is stateless if it performs this task without storing any per split flow information in the local memory in-between consecutive accesses to the flow. In this case, selection of the winning buffer is performed solely based on the sequence control header information by means of pair-wise comparison of the corresponding rank components. Provided the packet block loss remains within certain limits, a stateless re-assembly engine is able to restore the relative order in which the packets have to be delivered.

Figure 8:
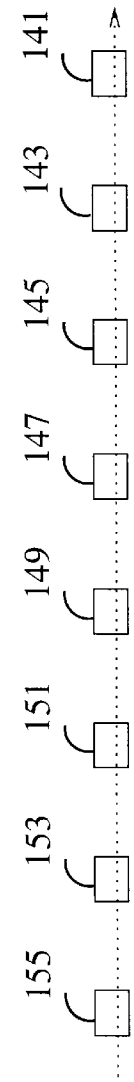
FIG. 8 illustrates the construction of the rank component for a single path pair.
Figure 8:
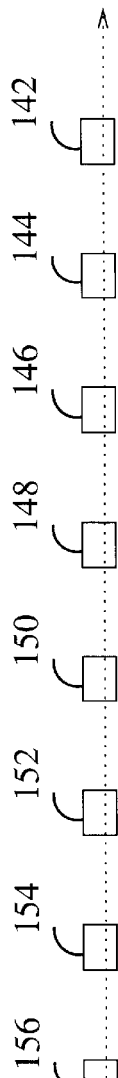

Consider one more time the case of a single path pair (see FIG. 8). The packet block transmissions, which alternate between the two paths, are sequentially numbered using m bit rank component spanning the range of $M \leq 2^m$. If no packet block losses occur (a packet block is considered lost if and only if all packet of that block are lost), then a stateless re-assembly engine using a single-bit rank component is able to restore the order of the packets: out of two packet with the same rank component, one belonging to a priority path is delivered first, whereas if the rank components of the head packets in the buffers are different, it is the other path which is given preference. However, if even a single packet block is lost, then the packet re-assembly order can be broken. Thus, if packet block 141 is lost in FIG. 8, then according to the above rule, packet block 143 is delivered before packet block 142, which constitutes a violation of the original order. To improve the robustness of the re-assembly engine, the higher order rank components have to be used. FIG. 8 provides an example of using a rank component of degree m=3 spanning the range of M=7. Path A is a priority path of the pair. Presented with two packets at the corresponding head of the buffers associated with switching path A and switching path B, a stateless re-assembly engine can tolerate a loss all packets within packet block 141, as well as a loss of all packets within packets blocks 141 and 143, since losing one or two packet blocks on path A is more likely, than losing, respectively, five or four packet blocks on path B. Only the loss of three packet blocks in a row, for example, 141, 143 and 145 on path A, would cause a confusion of the stateless re-assembly engine, since in this case two scenarios which could have cause the observed state of the re-assembly buffers (i.e., loss of 141, 143 and 145, on the one hand, and loss of packet blocks 148, 150 and 152, on the other hand) are approximately equally likely. Loss of more than four consecutive packet blocks on the same switching path, in general, leads to out-of-order packet delivery.

Maintaining a state at the re-assembly engine increases robustness while allowing the communication overhead to remain the same. For each path pair, the re-assembly state contains the most recently delivered rank component and an indication of whether or not the delivered packet belonged to a priority path. In this case, the state corresponding to the path pair of FIG. 8 can contain 0 as the rank component and the priority path flag set indicating the ongoing delivery of the packet block 0 on path A. Any number of packet blocks in the range from one to five lost consecutively on the same switching path can be detected by comparing the ranks of the subsequently received packets.

If six (or any multiple of 6) packet blocks are lost in a row, the receiver fails to detect the loss, since the two packets carry the same rank component and, therefore, are perceived as a single block with respect to the given path pair. When the number of lost packet blocks is greater than six, but is not a multiple of six, the loss is detected, but the count is determined incorrectly. The fault tolerant properties of the rank-based enumeration are summarized in Table 1, which shows the maximum tolerable number of consecutively lost packets per switching path for packet enumeration based on rank degree m.

TABLE 1

| Rank Component Range | Stateless Re-Assembly | State-Based Re-Assembly |
|---|---|---|
| $2^m$ | $2^{m-1}-1$ | $2^m-2$ |
| $2^m-1$ | $2^{m-1}-2$ | $2^m-3$ |

Note that the obtained values characterize the strictly worst-case behavior. In the multipath transmission, the rank components associated with different path pairs can actually provide combined protection, since a gap even in a single rank component sequence could indicate loss of a packet.

Figure 9:
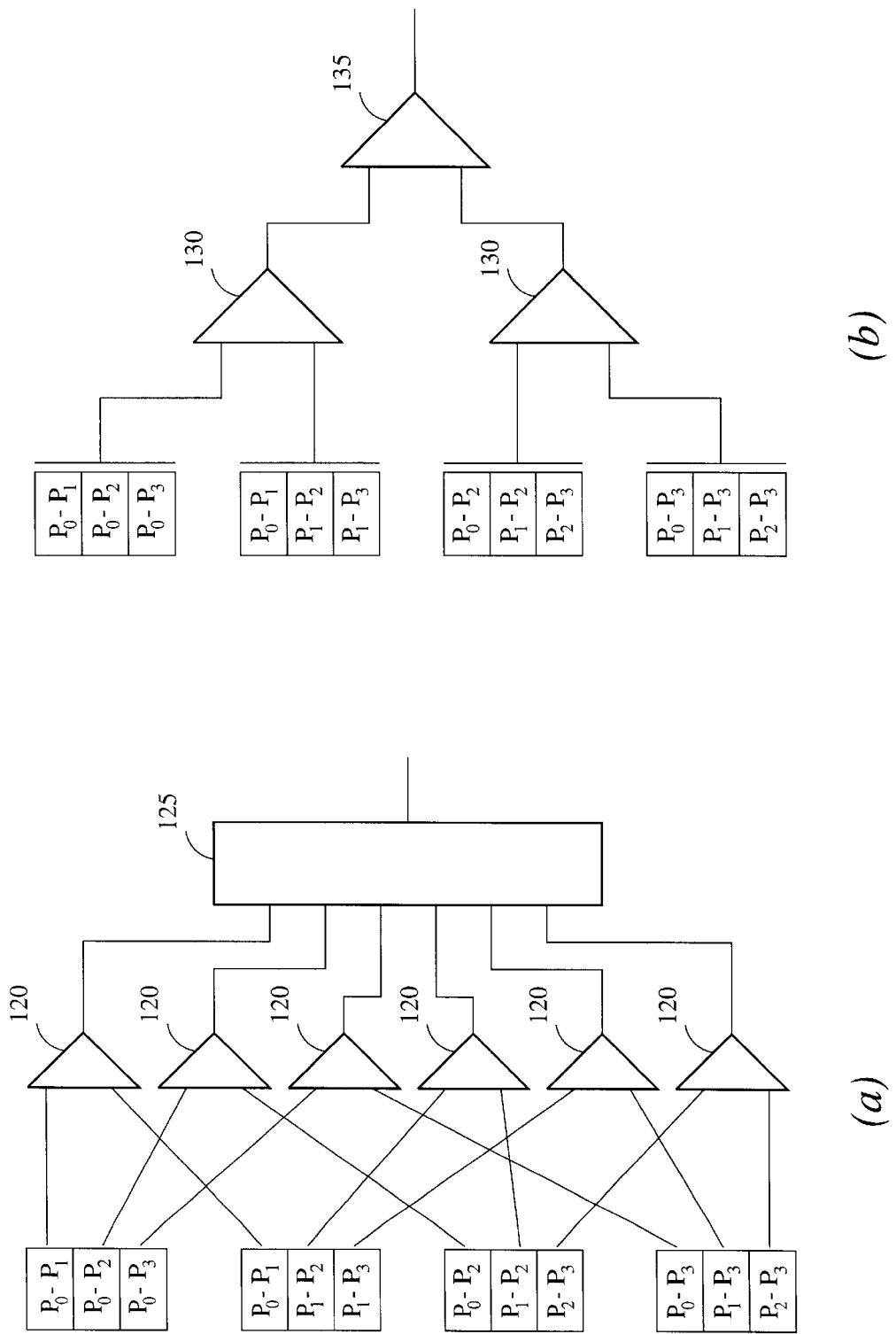
FIG. 9 illustrates two possible comparator structures to find a winning buffer among the set of buffers represented by the ranks of the corresponding head packets.

Both stateless and state-based selection of the winning buffer can be performed through rank component comparison either in parallel or in tree-like fashion, as shown in FIG. 9a–b. When the parallel comparison is performed (FIG. 9a), a comparator 120 is associated with each available path pair. It receives the corresponding rank components from two re-assembly buffers and produces at the output the id of the path whose rank component is smaller (taking into account the wrap-around in modulo $2^m$). In case of a tie, the output is equal to the priority path id. The outputs of all comparators are supplied to the input of the majority poller 125 which selects the id of the path to deliver. In the alternative case of the tree comparison (FIG. 9b), the complete rank of each packet is fed to a single two-way comparator 130. Comparator 130 examines the corresponding rank components, selects the packet to be delivered first among the two and supplies its complete rank and id to the next stage comparator 135. Next stage comparator acts in a similar way, so that the output of the last stage comparator contains the id of the packet to be delivered before others in the given subset.

Figure 10:
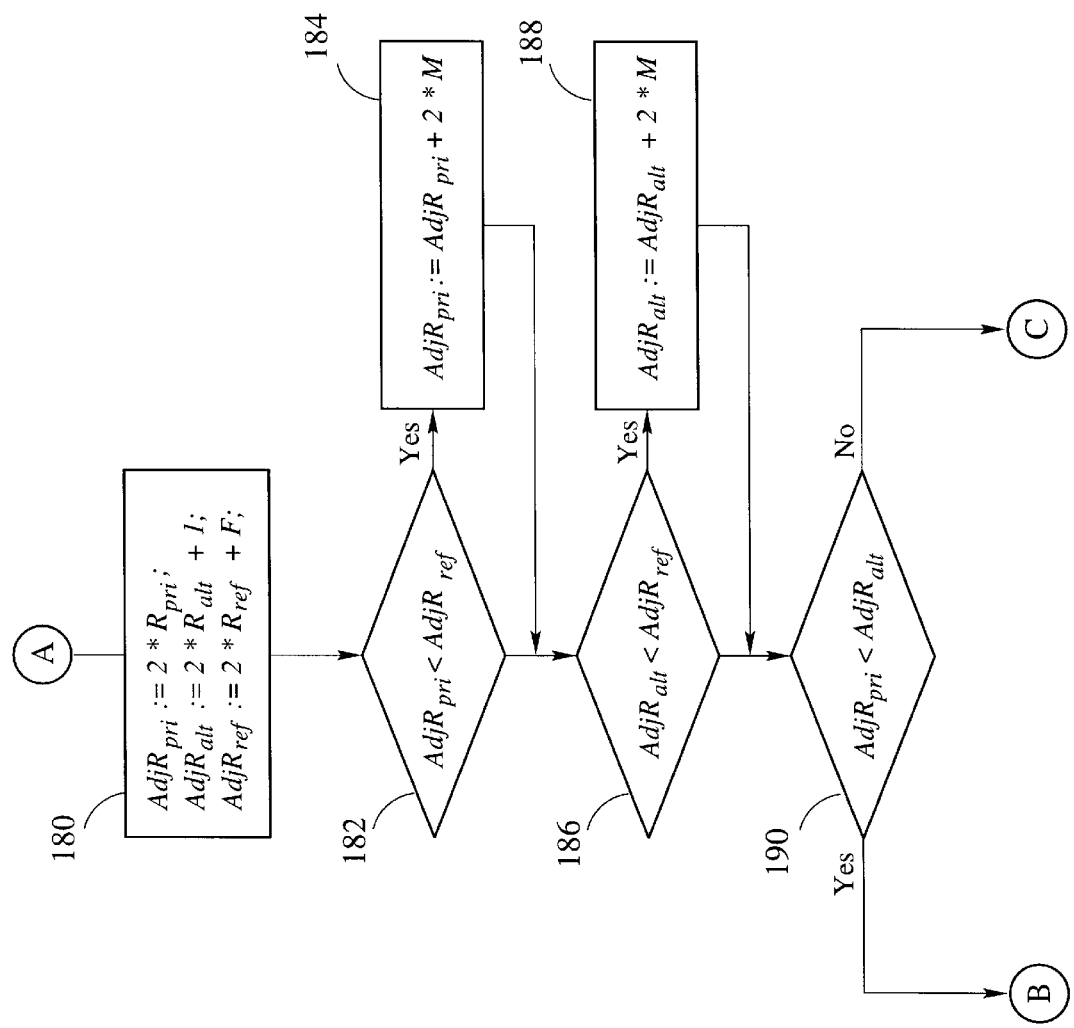
FIG. 10 is a flow-chart of the state-based rank component comparison.

The details of the state-based rank-component comparison are described in FIG. 10. The input data available at termination A include: rank component of a priority path of the path pair $R_{pri}$, rank component of an alternate path of the path pair $R_{alt}$, the most recently delivered rank component $R_{ref}$, indication F whether the most recently delivered rank component belonged to a priority path (F=0, if the most recently delivered rank component belonged to a priority path, F=1, otherwise), and the constant rank component range M. In step 180, the adjusted rank components are computed. The adjustment amounts to restoring the default least significant bit (LSB) of the rank components which can be achieved by the left-shift and setting the LSB to zero, if the given rank component pertains to a priority path of the pair, and to one, otherwise. Decision diamond 182 checks whether the rank component associated with a priority path has wrapped around with respect to the reference rank component; if this is the case, in step 184, the adjusted rank component associated with a priority path is converted by adding the doubled original range. Decision diamond 186 checks whether the rank component associated with an alternate path has wrapped around with respect to the reference rank component; if this is the case, in step 188, the adjusted rank component associated with an alternate path is converted by adding the doubled original range. Doubling of the range in both cases is necessary, because of the effective change of the range due to the adjustment operation of step 182. Finally, in step 190, the two adjusted rank components are compared to each other. Termination B corresponds to a priority path being the winner, whereas termination C corresponds to an alternate path being the winner.

Using rank component range of $M=2^m-1$ rather than $M=2^m$ allows to save one codepoint to support additional packet block prevention and recovery features. For example, the $2^m$-th codepoint can be used a periodic marker, functionally substituting one of the regular codepoints, e.g., for each n-th packet block having rank component 0 with respect to the given packet pair. Then counting packet blocks with rank component 0 occurring received in-between two consecutive packet blocks with the marked rank component would allow to detect the excessive packet loss which previously might have remained unnoticed using the regular means.

Another possible use of the the $2^m$-th codepoint is to restore synchronization between the dispatch and re-assembly engines. In that case, receipt of that codepoint on all paths with respect to a given path would cause the re-assembly engine to re-initialized the state associated with the given path.

To improve fault tolerance significantly, the core switching system should make every attempt to never discard the entire packet block. Preserving at least one of the discarded block would allow the re-assembly engine to proceed seamlessly.

Robustness in Rank Based Enumeration and Re-assembly

We have established that, using a state-based re-assembly scheme, provided that the maximum number of consecutively lost packet blocks on a path, with respect to any given pair, is bounded, the re-assembly engine 62 can correctly order the packets belonging to a split flow from the sub-flow storage 60, as long as the re-assembly engine can afford an indefinite wait. The state needed for the re-assembly process consists of the most recently delivered rank component for every path pair, and an indication of whether the delivered packet belonged to a priority path of ecaah pair. Henceforth, the combination of the two components of the state computed as in step 180 of FIG. 10 is referred to as a Reference Rank of the path pair.

The implication of the above is that, provided all the paths have packets waiting to be re-ordered (in the sub-flow storage 60), the method described in the previous subsection is sufficient for correctly choosing the winning path for the purpose of delivery. However, during re-ordering, some of the queues corresponding to a subset of the paths of the split flow may become empty. A queue may become empty due to a decision by the dispatch engine 52 to exclude the respective path from the dispatch process due to congestion and/or losses in the core switching system 10 on that path. In order to account for these contingencies, additional facility has to be introduced in the system.

There are two problems resulting from the presence of empty path queues in the sub-flow storage. First, assume we find the winner among all the non-empty paths. Assume further that there is exactly one re-assembly buffer that becomes empty at a certain point during the re-assembly process, and a decision has to be made whether we should proceed with the winner or wait for a packet to arrive to the empty re-assembly buffer, accounting for the fact that such packet might have been dispatched earlier than the currently determined winner. If the packet delay is not bounded, the question is undecidable, since it is impossible to distinguish the situation when the currently empty path had in fact been excluded by the ingress dispatch engine, and the situation when the next packet in the split flow packet order had been dispatched on that path but was indefinitely delayed by the core switching system. In the latter case, both the most recently delivered packet and the delayed packet belong to the same packet block with respect to all path pairs involving the empty path. We refer to this situation as the redundant wait problem.

Second, using the reference rank and the rank of the winner, it is possible to determine in some cases that there was indeed a packet that was dispatched before, on the now empty path. In that case, we may chose to consider the packet lost after waiting till a time-out and proceed with the re-assembly. However, since by the model assumption, the exact time-out value is impossible to find, we now need a mechanism to handle late arrivals, i.e., the situation where a packet that was considered lost arrives at a later point in time during the re-assembly. In summary, the presence of empty path queues, with or without losses needs to handled in an appropriate manner. We present here an extension of the previously described state-based re-assembly method that handles the redundant wait and the late arrivals in the presence of packet losses, provided that the maximum number of consecutively lost packet blocks is bound by the values of Table 1.

For this purpose, the packet header contains one additional field called the Next Path (NP) value. The Next Path of a packet is the id of the path, where the next packet is to be dispatched by the dispatch engine 50. In other words, by the time a packet of a split flow is dispatched to a certain switching path, the dispatch engine has to make a determination to which path the next packet of the same flow would be sent. This mechanism is referred to as predictive. The predicted NP value is assigned to an additional field in the packet's sequence control header.

The re-assembly engine 62 uses the Next Path values in the following manner. During re-assembly, while all the re-assembly buffers remain backlogged, a winner is chosen from among the buffers without any regard to the NP values in the sequence control headers. On the other hand, if one or more of the re-assembly buffers is empty, the NP value in the sequence control header of the most recently delivered packet is used to make a determination whether the re-assembly process should proceed or be suspended pending a packet arrival on one of the switching paths associated with presently empty re-assembly buffers. For each empty buffer, a path pair involving the NP path and the path associated with that buffer is considered. If the adjusted rank component of the NP path with respect to the given empty path is greater than the corresponding adjusted rank component of the most recently seen packet of the given empty path by exactly one, then re-assembly process can proceed with the previously found winner buffer. However, any other difference in the rank components indicates that there was a loss on this path; therefore, the re-assembly engine has to wait for packets to arrive to the empty buffers. Note however that, by not waiting on an empty path queue in the absence of losses, we have solved the redundant wait problem.

The re-assembly engine is provided with a time-out mechanism to manage the empty re-assembly buffers. When the time-out expires, all the queues that are still empty are considered expired. For this purpose, an additional component of the re-assembly rank state has to be maintained. All the expired buffers are ignored by the re-assembly engine until their states are changed by an appropriate incoming packet.

Expired queues are handled in the following manner. When a queue first becomes empty, the last dequeued rank is stored as a part of the state. We call this variable the Cut-off Rank. When a packet arrives to such a queue, the rank in the sequence control header of the arriving packet is compared with the Reference Rank with respect to the Cut-off Rank to determine if the arrival is late. If so, the packet is discarded and the cut-off is advanced to the rank of the discarded packet. If the incoming packet does not constitute a late arrival, it is enqueued in the previously empty re-assembly buffer, which immediately becomes eligible to be considered for re-assembly.

4. Preferred Embodiment

Ingress Dispatch Engine

Figure 11:
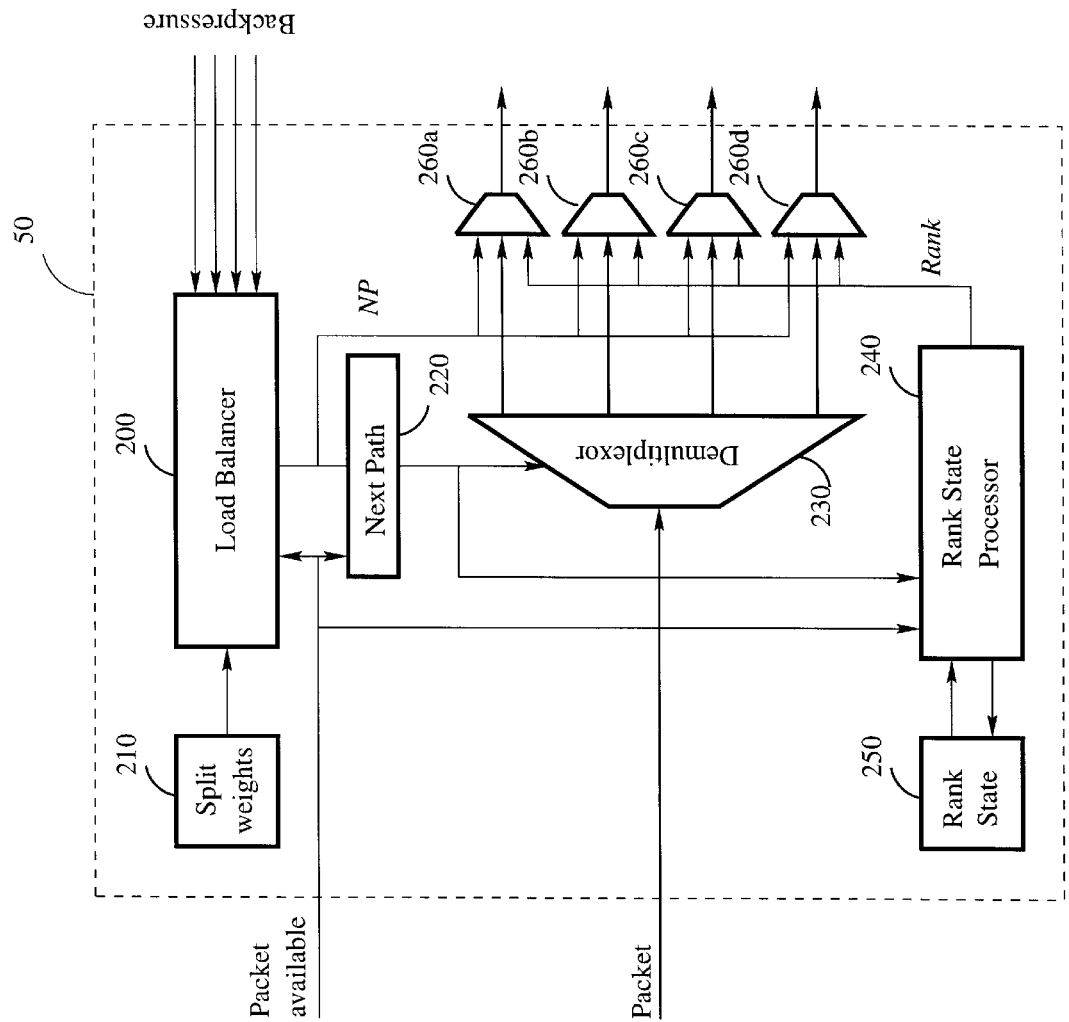
FIG. 11 is a detailed block diagram of the ingress packet dispatch engine.

The detailed block diagram of the ingress dispatch engine 50 is presented in FIG. 11. For each arriving packet which belongs to a split flow, load balancer 200, operating on a per-flow basis, computes the Next Path to dispatch (the NP value). The computations are performed based on the split weights stored in the static memory 210 and the backpressure information from the core switching system. Thus computed NP value is stored in the Next Path register 220 and at the same time inserted in the packet header using multiplexors 260a–260d. The dispatch path for the given packet is chosen by demultiplexor 230 based on the old value of the Next Path register determined on arrival of the previous packet of the same split flow. Therefore, the path selection process is predictive in nature. Rank state processor 240, which maintains the dispatch rank state in the dynamic memory 250, determines the rank of the given packet based on the current state and the identity of the switching path on which the packet is dispatched. The rank value is added to the sequence control header of the packet in appropriate multiplexor 260a–260d.

Let K be number of the available switching paths and m be the rank degree. The state maintained and processed by rank state processor 240 contains two vectors of size K(K−1)/2: the Header vector of (m+1)-bit values and Delta vector of 1-bit values For the sake of the functional description clarity, we represent the Header and Delta vectors as K×K matrices with idle diagonal entries, denoting them H and D, respectively. H is a symmetric matrix whose entries $H[i, j]=H[j, i]$ are equal to the current rank component associated with the $(P_i, P_j)$ path pair. On admission of a split flow, matrix H is initialized with all zeros. D is an antisymmetric binary matrix, whose entry $D[i, j]=1-D[j, i]$ is equal to 1 if and only if a packet transmission on path $P_j$ has occurred since the most recent packet transmission on path $P_i$. Matrix D is initialized with zeros in all its over-the-diagonal elements, which corresponds to a path with the smallest index being a priority path of each pair. By convention, the Next Path register is initialized with a pre-defined value $P_{init}$.

If on arrival of a split flow packet the Next Path register 220 contains path $P_i$, a functional equivalent of the following operations are performed by rank state processor 240:

$H[i, *]=H[i, *]+D[i, *]$;

$H[*, i]=H[i, *]$;

$D[i, *]=0$;

$D[*, i]=1_T$;

Rank=$H_{-1}[i, *]$.

Here $H[i, *]$ and $H[*, i]$ correspond to, respectively, the i-th row and i-th column of matrix H; 0 and 1 are row-vectors of zeros and ones, respectively; superscript T denotes transposition, and subscript (−1)—the element-wise truncation of the least significant bit. Addition is performed in modulo 2M arithmetic.

Earess Re-Assembly Engine

Figure 12:
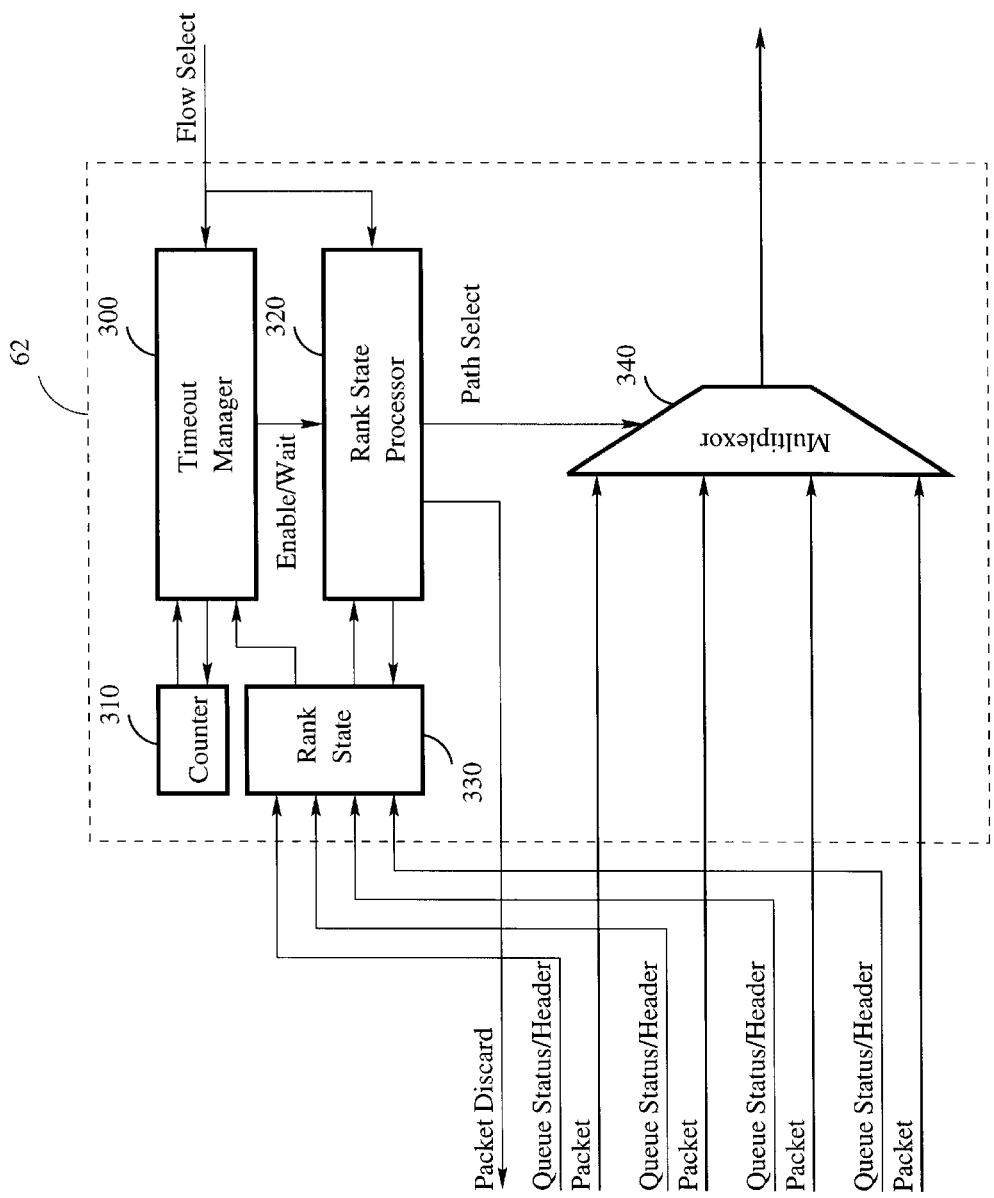
FIG. 12 is a detailed block-diagram of the egress packet re-assembly engine.

The detailed block diagram of the ingress dispatch engine 62 is presented in FIG. 12. Upon receipt of a Flow Select signal from a link scheduler or downstream application processor, rank state processor 320 performs state-based comparison of the sequence control headers belonging to the packets at the corresponding heads of the re-assembly buffers and selects the winning path, i.e., the one whose packet should be delivered before the other currently backlogged paths. Rank state processor 320 operates using the rank state stored in dynamic memory 330. At the same time, timeout manager 300 checks the backlog status of the queues, and makes the decision whether the dequeue and delivery should proceed or be suppressed pending an arrival of a packet to one of the currently empty re-assembly buffers (if any). If timeout manager 300 decides to proceed, the winning path found by rank state processor 320 is used to operate multiplexor 340, which dequeues a packet from the selected re-assembly queue, delivering to the output of the dispatch engine, and fetches the sequence control header of the subsequent packet in that queue. Otherwise, the dequeue procedure is suppressed and the timeout counter stored in the dynamic memory 310 is decremented. As in a system with bandwidth reservation, the process of selecting the given split flow for service is periodic (or can be modified to approximate such process through an appropriate thinning applied to the sequence of Flow Select signals), the timeout counter should be initialized with the estimate of the maximum differential delay between switching paths expressed in the guaranteed flow service period. The increments of the timeout counter are related to the process of packet arrivals to the re-assembly buffers. The sequence control header of the first packet in each re-assembly buffer is a part of the rank state stored in dynamic memory 330. The state is maintained both on arrival, by isolating the header and writing it to memory 330 when a packet arrives to an empty re-assembly buffer, and on service from the selected re-assembly buffer, when the sequence control header of the next packet in the that buffer is fetched and written into memory 330.

Let K be number of the available switching paths, m be the rank degree and M—the rank component range. The maintained re-assembly rank state per split flow consists of the NP value, the K-entry queue status indication vector Empty and two vectors of size K(K−1)/2: the Current vector and the Reference vector of (m+1)-bit values each. As before, to ensure compactness of the functional description, the Current and Reference vectors are represented with K×K matrices having idle diagonal entries, denoted C and Ref, respectively. Empty is a binary vector with Empty[i]=1 if and only if the i-th re-assembly buffer is empty. C is a general matrix whose element C[i, j]is equal to the adjusted ($P_i$, $P_j$) rank component of the sequence control header belonging to the first packet in the i-th re-assembly buffer, if that buffer is backlogged, or to the adjusted ($P_i$, $P_j$) rank component of the packet most recently seen in that buffer (i.e., the last packet dequeued or discarded on arrival), if it is currently empty. Rank component adjustment amounts to the left shift and setting the least significant bit in accordance with the priority status of the packet's path in the pair. Ref is a symmetric matrix whose entries Ref[i, j]=Ref[j, i] are equal to the adjusted ($P_i$, $P_j$) rank component of the packet most recently dequeued or discarded from either i-th or j-th re-assembly buffer. Initially, NP is set to a predefined value $P_{init}$, vector Empty is all ones, and both matrices C and Ref contain zeros in all their non-diagonal elements.

The re-assembly rank state manipulations can be triggered either by a packet arrival to an empty re-assembly buffer, or by Flow Select signal from a link scheduler or downstream application processor. When these events occur, a functional equivalent of the following operations should be performed (all comparison, addition and maximization operations are on extended rank components in modulo 2M).

On arrival of a packet carrying rank Rank to the i-th re-assembly buffer while Empty[i]=1, rank state processor 320 executes:

```
Temp := TRUE;
compare component-wise Rank with Ref[i, *] with respect to C[i, *];
if comparison result is LESS THAN for one or more components then
    Temp := FALSE;
endif
if Temp == TRUE then
    C[i, *] := Rank;
    Empty[i] := 0;
else
    Ref[i, *] := max { Ref[i, *], Rank } with respect to C[i, *];
    C[i, *] := Rank;
    assert Packet Discard;
endif
On receipt of Flow Select signal, timeout manager 300 executes:
Temp := TRUE;
if Empty[NP] == 1 then
    Temp := FALSE;
else if Empty != 0 then
    for all j such as Empty[j] == 1 do
        if C[NP, j] != C[j, NP] + 1 then
            Temp := FALSE;
        endif
    endfor
endif
if Counter != 0 and Temp == FALSE then
    decrement Counter;
endif
if Counter == 0 or Temp == TRUE then
    assert Enable;
else
    assert Wait;
endif
On receipt of Flow Select signal, rank state processor 320 executes:
    if Enable then
        select Winner, the path to dequeue before the other backlogged paths;
        dequeue and deliver a packet from path Winner;
        if no more packets in re-assembly buffer Winner then
            Ref[Winner, *] := C[Winner, *];
            Empty[Winner] := 1;
        else
            Ref[Winner, *] := C[Winner, *];
            C[Winner, *] := SeqCtrlHeader.Rank;
            NP := SeqCtrlHeader.NP;
        endif
    else
        do nothing;
    endif
```

Here SeqCtrlHeader is the sequence control header of the packet which appears at the head if the winning re-assembly buffer after the dequeue operation.

Various additional modifications of this invention will occur to those skilled in the art and all deviations from the specific teachings of this specification that basically rely upon the principles and their equivalents through which the art has been advanced are properly considered within the scope of the invention a described and claimed.

The invention claimed is:

1. A method of transmitting a packet in a multipath network comprising the steps of:

determining a number of available paths through the network;

selecting a path i from the number of available paths over which to transmit the packet;

determining a set of available paths that have been used for packet transmission since path i was last used;

generating a sequence control header representing the determined set of used available paths; and transmitting the packet including the generated sequence control header over the selected path i.

2. A method of maintaining packet order between a source and a destination in a multipath network comprising the steps of:

determining a number of available paths through the network;

at the source:

selecting a path i from the number of available paths over which to transmit the packet;

determining a set of available paths that have been used for packet transmission since path i was last used;

generating a sequence control header representing the determined set of used available paths; and transmitting the packet including the generated sequence control header over the selected path i, at the destination;

enqueuing received packets into separate reassembly queues, one for each available path; and determining a proper order of the received packets from the sequence control header of the packets contained at the head of the reassembly queues.

3. A method of maintaining packet order in a split flow transmission between a source and a destination in a multipath network comprising the steps of:

determining a number of available paths through the network;

at the source:

selecting a path i from the number of available paths over which to transmit the packet;

determining a set of available paths that have been used for packet transmission since path i was last used;

generating a sequence control header representing the determined set of used available paths; and transmitting the packet including the generated sequence control header over the selected path i;

at the destination:

enqueuing received packets into separate reassembly queues, one for each available path and each split flow; and determining a proper order of the received packets pertaining to the same split flow from the sequence control header of the packets contained at the head of the reassembly queues.

4. The method according to claim 3 further comprising the step of:

updating local state information pertaining to each split flow.

5. A method of transmitting a packet in a multipath network comprising the steps of:

determining a number of available paths k through the network;

selecting a path i from the number of available paths k over which to transmit the packet;

determining a set of available paths that have been used for packet transmission since path i was last used;

generating a sequence control header comprising rank components respectively related to each path other than path i; and transmitting the packet including the generated sequence control header over the selected path i.

6. The method of claim 5, wherein said selecting comprises:

identifying path pairs among the available paths k; and creating a sequence control state for each flow split and each path pair.

7. The method of claim 6, further comprising establishing a priority path between each path pair.

8. The method of claim 7, wherein said establishing is performed between a transmitter and a receiver.

9. The method of claim 7, wherein a path having a lower ordinal index is a priority path of said path pair.

10. The method of claim 9, wherein the respective rank components comprise:

a respective packet block sequence number; and said packet block sequence numbers wrap-around in modulo $2^m$, wherein m is an integer greater than 1.

11. The method of claim 10, wherein said packet block sequence number is transmitted with each packet.

12. The method of claim 11, wherein a least significant bit of said packet block sequence number is dropped during transmission of a packet.

13. The method of claim 10, wherein the respective rank components comprise k−1 bits.

* * * * *